US011050617B2

(12) United States Patent
Stark (10) Patent No.: US 11,050,617 B2
(45) Date of Patent: Jun. 29, 2021

(54) INTELLIGENT CONTENT SERVER HANDLING OF CLIENT RECEIPT DISRUPTIONS

(71) Applicant: T-Mobile USA, Inc., Bellevue, WA (US)

(72) Inventor: Brian Stark, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/373,903

(22) Filed: Apr. 3, 2019

(65) Prior Publication Data

US 2020/0322217 A1    Oct. 8, 2020

(51) Int. Cl.
*H04L 12/24* (2006.01)
*H04L 12/911* (2013.01)
*H04L 12/26* (2006.01)

(52) U.S. Cl.
CPC ...... *H04L 41/0816* (2013.01); *H04L 43/0805* (2013.01); *H04L 47/745* (2013.01)

(58) Field of Classification Search
CPC ............. H04L 41/0816; H04L 43/0805; H04L 47/745
See application file for complete search history.

(56) References Cited

U.S. PATENT DOCUMENTS

| | | | |
|---|---|---|---|
| 7,080,158 B1* | 7/2006 | Squire ................. | H04L 67/2814 370/389 |
| 2003/0236905 A1* | 12/2003 | Choi ..................... | H04L 29/06 709/231 |
| 2012/0130851 A1* | 5/2012 | Minnick ............ | G06Q 30/0633 705/26.8 |
| 2014/0236739 A1* | 8/2014 | MacTiernan ....... | G06Q 30/0277 705/14.73 |
| 2014/0280768 A1* | 9/2014 | Calo ..................... | H04L 69/18 709/219 |
| 2015/0256600 A1* | 9/2015 | Dakhane ................. | H04L 65/60 709/203 |
| 2016/0156520 A1* | 6/2016 | Scully .................. | H04L 41/0893 370/254 |
| 2017/0353516 A1* | 12/2017 | Gordon ................... | H04L 67/10 |
| 2018/0034873 A1* | 2/2018 | Brown ................ | H04L 65/4084 |
| 2019/0327033 A1* | 10/2019 | Huang .................. | H04L 1/1835 |

* cited by examiner

*Primary Examiner* — Michael A Keller
(74) *Attorney, Agent, or Firm* — Brownstein Hyatt Farber Schreck, LLP (57) ABSTRACT

An electronic device (such as an origin server) in a content delivery system performs intelligent content server handling of client receipt disruptions. The electronic device may receive requests for segments of a content asset submitted using a manifest that has segment request addresses with session identifiers, estimate a session interruption using the requests and the session identifiers, and handle the session interruption. The electronic device may handle the session interruption by scheduling a recording of the content asset, reallocating network resources, and so on. In some examples, the electronic device may also provide the manifest.

20 Claims, 8 Drawing Sheets

FIG. 6

INTELLIGENT CONTENT SERVER HANDLING OF CLIENT RECEIPT DISRUPTIONS

FIELD

The described embodiments relate generally to content delivery systems. More particularly, the present embodiments relate to content servers intelligently handling client receipt disruptions.

BACKGROUND

Content delivery systems may provide a wide variety of content assets to a wide variety of client devices over a variety of different wired and/or wireless communication media. For example, content delivery systems may provide television programs and movies and/or other video, music and/or other audio, images, and so on. Content delivery systems broadcast content assets, provide content assets on demand, and/or provide access to content assets in a variety of different ways.

A content delivery system may provide content assets using one or more origin servers. Such an origin server may obtain content assets from a source of content, such as a terrestrial broadcast system or a programming provider, and provide the obtained content assets to client devices via one or more communication media.

For example, the origin server and/or another device may provide a manifest to one or more client devices. The manifest may include pointers and/or other mechanisms that a client device may use to request segments of a content asset stored at the origin server. In some implementations that use ABR techniques, the origin server may store segments for different versions of the content asset that each have different bitrates and may switch between providing segments having different bitrates according to changes in available communication network bandwidth, client device hardware and/or software resources, and/or a variety of other different conditions.

SUMMARY

The present disclosure relates to intelligent content server handling of client receipt disruptions. An electronic device (such as an origin server) receives requests for segments of a content asset submitted using a manifest that has segment request addresses with session identifiers, estimates a session interruption using the requests and the session identifiers, and handles the session interruption. The electronic device may handle the session interruption by scheduling a recording of the content asset, reallocating network resources, and so on. In some examples, the electronic device may also provide the manifest.

In various embodiments, an electronic device includes a non-transitory storage medium that stores instructions and a processor. The processor executes the instructions to provide a manifest for a content asset including segment request addresses that have session identifiers, determine unreceived segment requests using the session identifiers, estimate a session interruption using the unreceived segment requests, and schedule a recording of the content asset.

In some examples, the processor determines a network bandwidth unavailability using received segment requests and the session identifiers. In various implementations of such examples, the processor assigns additional network resources based on the network bandwidth unavailability.

In a number of examples, the processor directs deletion of the recording if the recording is not accessed within a time period. In some examples, the processor transmits a notification to a user electronic device regarding availability of the recording.

In various examples, the processor receives segment requests from a first electronic device associated with a user and schedules the recording by directing transmission of the content asset to a second electronic device associated with the user. In some implementations of such examples, the first electronic device is a mobile electronic device and the second electronic device is a digital video recorder.

In some embodiments, an electronic device includes a non-transitory storage medium that stores instructions and a processor. The processor executes the instructions to provide a manifest for a content asset including segment request addresses that have session identifiers, determine received segment requests using the session identifiers, and determine a network bandwidth unavailability by estimating an increased time between the received segment requests using the session identifiers.

In various examples, the processor estimates a session interruption based on unreceived segment requests determined using the session identifiers. In some implementations of such examples, the processor schedules a recording of the content asset.

In a number of examples, the processor directs an adjustment of network resources to mitigate the network bandwidth unavailability. In various examples, the received segment requests are a first set of received segment requests and the processor further determines the network bandwidth unavailability using a second set of received segment requests.

In some examples, the received segment requests are received using a wireless network. In various implementations of such examples, the wireless network is a cellular network.

In a number of embodiments, a content delivery system includes a non-transitory storage medium that stores instructions and a processor. The processor executes the instructions to receive requests for segments of a content asset submitted using a manifest that has segment request addresses with session identifiers, estimate a session interruption using the requests and the session identifiers, and handle the session interruption.

In some examples, the processor handles the session interruption by storing a copy of the content asset for a requestor who submitted the requests. In a number of implementations of such examples, the processor determines a session resumption and deletes the copy of the content asset. In various examples, the processor handles the session interruption by reallocating network resources. In some examples, the content asset is a first version of the content asset having a first bit rate and the processor handles the session interruption by providing access to a second version of the content asset having a second bit rate that is less than the first bit rate. In various examples, the processor handles the session interruption by moving at least a portion of the segments of the content asset to an electronic device closer to a source of the requests.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Client devices may execute a player application that uses a manifest to request segments of a content asset, reassembles the received segment, and presents the reassembled segments. In some situations, a user may stop the player application prior to the presentation completion and the player application may thus not request all of the segments. In other situations, the player application may request but not receive some of the segments due to problems with one or more communication networks and/or other communication media that the player application uses to request and/or receive the segments. For example, a player application may use a cellular network that may become partially and/or fully unavailable due to network congestion, loss of connection to one or more cell sites, and so on. As a result, some or all of the segment requests may be lost and/or some or all of the segments may be requested but not received. This may cause the player application to be unable to present all of the content asset despite not being instructed by a user to stop presentation.

In some implementations, an origin server may be configured to provide one or more segments of a content asset for a particular range of time. By way of illustration, an origin server may obtain a content asset from a source and may provide segments of that content asset during a time range when the content asset is scheduled for broadcast via one or more content broadcast systems. For example, an origin server may obtain a police drama that is scheduled for terrestrial television broadcast from five to six PM on a particular day and the origin server may provide access to that obtained police drama from five to six PM on that particular day. After that time, absent receiving a request to store the police drama for later viewing, the origin server may free up storage by purging the police drama. As such, if a client device was unable to receive and/or present all of a content asset requested by a user due to communication network issues, the content asset may not be accessible later when the communication network issue is resolved. This may result in incomplete content asset access, impaired content delivery network performance, poor user experience, and so on.

If an origin server and/or another device were configured to be aware that communication network issues and/or other issues interfered with segment requests and/or segment delivery, the origin server could be configured to handle such issues in a variety of different ways. The origin server could schedule a recording of the content asset, direct reallocation of network resources, and so on. However, many origin servers may be unable to determine whether or not such issues occur.

Origin servers in content delivery systems may provide segments of a content asset to a client device submitted using a manifest without monitoring the segments that are requested and the segments that are not requested. In many implementations, manifests that can be used to request the segments of the content asset may be provided to many different client devices. As such, even if the origin server tracked requested segments, the origin server may be unable to determine the associated client device and would thus be unable to determine whether or not each client device requested and obtained all segments for a content asset. Without being able to determine whether or not an issue occurred that may have prevented a request and/or receipt of all segments of a content asset, the origin server may be unable to take any actions to handle such issues.

The following disclosure relates to intelligent content server handling of client receipt disruptions. An electronic device (such as an origin server) receives requests for segments of a content asset submitted using a manifest that has segment request addresses with session identifiers, estimates a session interruption using the requests and the session identifiers, and handles the session interruption. The electronic device may handle the session interruption by scheduling a recording of the content asset, reallocating network resources, and so on. In some examples, the electronic device may also provide the manifest.

In this way, the electronic device may be able to perform more intelligent content server handling of client receipt disruptions. The electronic device may be able to mitigate disruptions by ensuring that content assets are available for later access when a disruption prevented access, resolve disruptions by reallocating network recourses, improve system performance by improving access to content assets while reducing network traffic, improve system efficiency by reducing storage and/or the components used and/or the actions performed, and so on.

In the context of the present application, a content asset may be any media file (such as a television program, a movie, and so on) that may be divided into a linear series of segments and provided to a user device. Segments may be a portion of that divided content asset. The user device may obtain the segments, reassemble the segments into the series, and present the reassembled series of segments to present the content asset. The segments may be provided to the user device in response to segment requests made using a manifest. The manifest may be a list or other structure that includes location information for requesting the segments as well as session identifiers. The session identifiers may be unnecessary for locating the requested segment, but may be any kind of identifying information that may be included in the manifest and the segment requests that identifies the session of which the segment request is a part. A session may be a sequence of segment requests, received segments, and so on for the segments of a particular content asset made by a particular electronic device within a period of time (such as an hour).

These and other embodiments are discussed below with reference to FIGS. 1-6. However, those skilled in the art will readily appreciate that the detailed description given herein with respect to these Figures is for explanatory purposes only and should not be construed as limiting.

Figure 1:
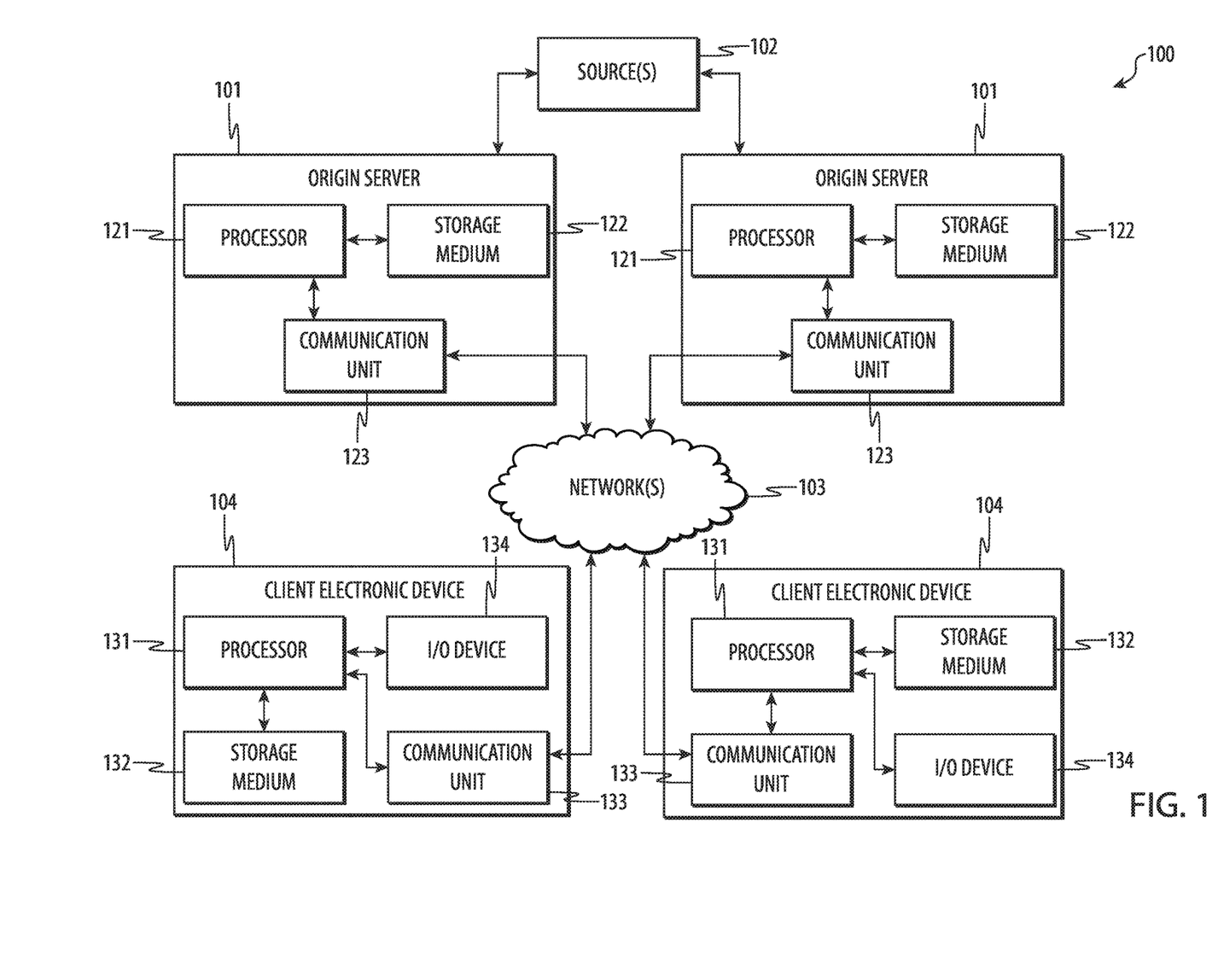
FIG. 1 depicts a first example system for intelligent content server handling of client receipt disruptions.

FIG. 1 depicts a first example system 100 for intelligent content server handling of client receipt disruptions. The system 100 includes one or more origin servers 101 that may be operative to obtain one or more content assets from one or more content sources 102 and provide the content asset to one or more client electronic devices 104 via one or more wired and/or wireless communication networks 103.

The origin server 101 may store the content asset in a number of segments and provide one or more of the segments to the client electronic device 104 upon request. In some implementations, the origin server 101 may divide the content asset into the segments.

In various implementations, the origin server 101 may provide a manifest to the client electronic device 104. The manifest may include one or more pointers to each of the segments (and/or any other link or locator/location mechanism) of the content asset. In some implementations, the manifest may specify information for the segments of a single content asset. In other implementations, a single manifest may specify information for segments of multiple content assets. The client electronic device 104 may use the manifest to request one or more of the segments of the content asset (such as via a HyperText Transfer Protocol pull request), reassemble the segments, and present the reassembled segments.

The manifest may also include metadata regarding the segments. For example, the pointers for each of the segments may include session identifiers. The session identifiers may be included when the client electronic device 104 uses the manifest to request a segment (and/or in one or more acknowledgments the client electronic device 104 transmits to confirm receipt of requested segments), but may not be actually used to identify and/or locate the requested segment. The session identifiers may uniquely and/or semi-uniquely identify a "session," or group of segments for a content asset requested by a single client electronic device 104 and/or using a single manifest.

The session identifiers may be unique if the session identifiers are only used once and thus only correspond to a single session. The session identifiers may be semi-unique where they are not only used once, but are reused in a fashion that different sessions can still be differentiated (such as where session identifiers from an old session that can no longer be pending are reused for a different pending session, where session identifiers are used for different sessions in different areas and the different sessions can thus be differentiated based on the different areas, where session identifiers are used for different sessions on different communication media and the different sessions can thus be differentiated based on the different communication media, and so on). The session identifiers may identify the session and/or the particular segment. In some implementations, the session identifiers may identify other information, such as the requester, the client electronic device 104, a user, a content delivery system account, a geographic location, particular hardware used, and so on.

The origin server 101 and/or other one or more other electronic devices may receive requests for segments and/or acknowledgments of receipt of requested segments, track and/or otherwise monitor session identifiers associated with the requests and/or acknowledgments, and/or estimate and/or otherwise determine when one or more session interruptions occur. In response to estimating a session interruption, the origin server 101 may handle the session interruption. Such handling may include scheduling a recording (i.e., a copy) of the content asset.

Recording the content asset in response to estimating a session interruption may allow the content to be available for later access if a session interruption has actually occurred. In some examples, the origin server 101 may direct deletion of the recording if the origin server 101 determines that the session resumes (i.e., a session resumption) and/or the recording is not accessed within a period of time (such as one hour, two weeks, and so on). By way of elaboration, the fact that the session resumes and/or that the recording is not accessed within the time period may indicate that the session was not actually interrupted or that the session was intentionally stopped rather than a session interruption occurring as had been estimated. It may alternatively indicate that a session interruption occurred, but the recording will not be ever accessed regardless of the session interruption. Regardless, deletion after the time period may free up storage if the recording will not be used.

In various examples, the origin server 101 may use the estimated session interruption and/or the session identifiers to determine that a network bandwidth unavailability exists. Such a network bandwidth unavailability may have caused the session interruption. In response to such a determination, in implementations where the origin server 101 is operative to control and/or instruct control of the network 103, the origin server 101 may direct and/or otherwise reallocate and/or otherwise adjust network resources (such as by assigning additional network resources) to mitigate the network bandwidth unavailability. This may handle a session interruption resulting from the network bandwidth unavailability.

In other examples, the origin server 101 may perform other actions to handle a session interruption. Such actions may include moving and/or caching the content asset at another electronic device that is closer and/or otherwise more accessible to the client electronic device 104, providing access to another version of the content asset that has a lower bit rate than that of the content asset (such as where the system 100 is an ABR content delivery system), transmitting one or more notifications and/or prompts to the client electronic device 104 and/or an associated electronic device (such as a text message, email, phone call, and/or other notification that a copy of the content asset has been recorded due to a session interruption and is available for later access, a prompt asking whether or not to record a copy of the content asset in response to an estimated session interruption, and so on), and so on.

By way of illustration of using session identifiers to estimate a session interruption, in some examples, the origin server 101 may evaluate session identifiers to determine which session identifiers have been received and which have not been received. If the origin server 101 determines that all session identifiers associated with a particular session have been received, the origin server 101 may estimate that a session interruption has not occurred. However, if the origin server 101 determines that there are unreceived segment requests, such as where the origin server 101 has not received some of the session identifiers, the origin server 101 may estimate that a session interruption has occurred.

In some situations, unreceived session identifiers may not indicate a session interruption. For example, session identifiers may not have been received if the session is still ongoing. By way of another example, session identifiers may not have been received if a user provided input to the client electronic device 104 to cease requesting segments and/or presenting the content asset. As such, the origin server 101 may evaluate a variety of different factors in a variety of different implementations to estimate whether or not unreceived session identifiers indicate a session interruption.

For example, the origin server 101 may estimate that a session interruption has not occurred if an unreceived segment request is within a period of time (such as two seconds) from a previous segment request associated with the same session. By way of another example, the origin server 101 may estimate that a session interruption has occurred if an unreceived segment request is not within a period of time (such as ten seconds) from a previous segment request associated with the same session.

In various examples, the origin server 101 may estimate that the session was intentionally stopped rather than that a session interruption has occurred if the time between a number of previous received segment requests (whether for the same session or other sessions in the same geographic area, on the same network 103, and so on) decreased or stayed the same. In such an example, the origin server 101 may estimate that a session interruption has occurred rather than that a session was intentionally stopped if the time between a number of previous received segment requests (whether for the same session or other sessions in the same geographic area, on the same network 103, and so on) increased and/or progressively increased. Such an increase and/or progressive increase may indicate that the network 103 is becoming increasingly congested, the network 103 may become disconnected and/or unavailable, and/or other conditions are occurring that may cause network bandwidth to be unavailable.

The origin server 101 and/or the client electronic device 104 may be any kind of electronic device. Examples of such electronic devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The communication network 103 may be any kind of network, such as a cellular network, a coaxial cable network, a satellite network, a TCP/IP (transmission control protocol/internet protocol) network, a WiFi network, the Internet, and so on. In various examples, the system 100 may be a content delivery system.

The origin server 101 may include one or more processors 121 and/or other processing units and/or controllers, one or more non-transitory storage media 122 (which may take the form of, but is not limited to, a magnetic storage medium; optical storage medium; magneto-optical storage medium; read only memory; random access memory; erasable programmable memory; flash memory; and so on), one or more communication units 123, and/or other components. The processor 121 may execute instructions stored in the non-transitory storage medium 122 to perform various functions. Such functions may include obtaining content assets from the source 102, communicating with the client electronic device 104 using the communication unit 123, storing content assets, segmenting content assets, generating and/or providing manifests, providing segments in response to requests, tracking and/or monitoring session identifiers and/or sessions, estimating session interruptions, handling session interruptions, scheduling recordings of content assets, determining network bandwidth unavailability, directing reallocation and/or other reassignment and/or adjustment of network resources, and so on.

Similarly, the client electronic device 104 may include one or more processors 131, non-transitory storage media 132, input and/or output devices 134 (such as one or more displays, touch screens, buttons, speakers, microphones, printers, computer mice, keyboards, track pads, and so on), communication units 133, and so on. The processor 131 may execute instructions stored in the non-transitory storage medium 132 to perform various functions. Such functions may include obtaining one or more manifests, requesting segments of one or more content assets, reassembling segments, presenting reassembled segments via the input and/or output device 134, receiving user input via the input and/or output device 134, performing actions in response to user input, and so on.

Figure 2:
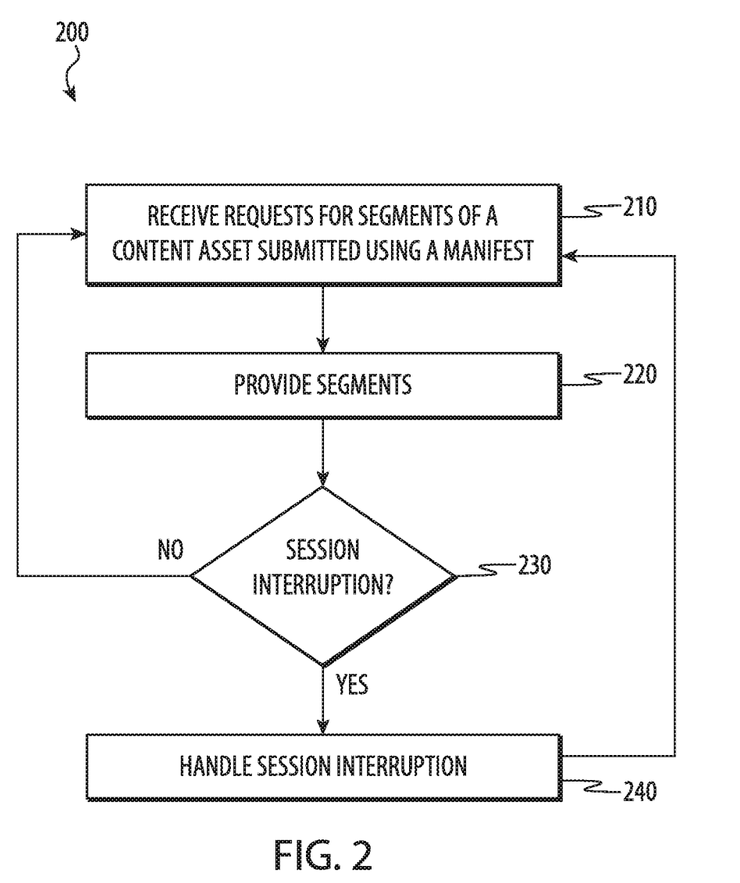
FIG. 2 depicts a flow chart illustrating a first example method for intelligent content server handling of client receipt disruptions. This method may be performed by the system of FIG. 1.

FIG. 2 depicts a flow chart illustrating a first example method 200 for intelligent content server handling of client receipt disruptions. This method 200 may be performed by the system 100 of FIG. 1.

At 210, an electronic device, such as the origin server 101 of FIG. 1, may receive one or more requests for segments of a content asset submitted using a manifest. The manifest may include one or more pointers or other mechanisms that specify the location of and/or may otherwise be used to obtain the segments. The pointers may include one or more session identifiers. The session identifiers may be used to track a session associated with a particular client electronic device obtaining the segments of a particular content asset. In various implementations, the session identifiers may not be used in identifying the segments, identifying the location of segments, and/or triggering transmission of particular segments. The request may include data from the pointers and/or the session identifiers and/or other metadata.

At 220, the electronic device may provide one or more segments in response to the request. In some examples, the electronic device may receive one or more acknowledgements of provided segments. Such acknowledgements may include the session identifiers.

At 230, the electronic device may determine and/or estimate whether or not a session interruption has occurred. The electronic device may analyze the session identifiers and/or the requested segments to determine this. In various implementations, the electronic device may determine which session identifiers have been received, which session identifiers have not been received, which segments have been requested, which segments have not been requested, times between requested segments and whether or not these times change over a period of time, times between receipt of the session identifiers and whether or not these times change over a period of time, whether or not network bandwidth issues are detected in other sessions on the same communication network and/or in the same area (which may be determined according to the communication network on which the electronic device receives segment requests and/or or session identifiers, communication network and/or area identifiers included in data headers or similar structures, and so on), and so on.

If the electronic device does not determine that a session interruption has occurred, the flow may return to 210 where the electronic device may continue to receive requests for segments. Otherwise, the flow may proceed to 240 where the electronic device may handle the session interruption before the flow returns to 210 where the electronic device may continue to receive requests for segments.

The electronic device may perform a variety of different actions in an attempt to handle the session interruption. In some implementations, the electronic device may schedule a recording of the content. In other implementations, the electronic device may reallocate and/or otherwise adjust network resources.

By way of illustration of the example method 200, an origin server may provide segments of a content asset to a mobile electronic device of a user as part of a session via a cellular network. The origin server may determine that the session is interrupted. As such, the origin server may schedule a digital video recorder at the user's home to record the content asset via an Internet connection so that the content asset will be waiting for the user when the user reaches home. Various configurations are possible and contemplated without departing from the scope of the present disclosure.

Although the example method 200 is illustrated and described as including particular operations performed in a particular order, it is understood that this is an example. In various implementations, various orders of the same, similar, and/or different operations may be performed without departing from the scope of the present disclosure.

For example, 240 is illustrated and described as the electronic device handling the session interruption. However, it is understood that this is an example. In other implementations, the electronic device may perform different actions without departing from the scope of the present disclosure. For example, in various implementations, the electronic device may prompt a user to confirm whether or not a session interruption actually occurred. Various configurations are possible and contemplated without departing from the scope of the present disclosure.

In a number of implementations, a content delivery system may include a non-transitory storage medium that stores instructions and a processor. The processor may execute the instructions to receive requests for segments of a content asset submitted using a manifest that has segment request addresses with session identifiers, estimate a session interruption using the requests and the session identifiers, and handle the session interruption.

In some examples, the processor may handle the session interruption by storing a copy of the content asset for a requestor who submitted the requests. In a number of such examples, the processor may determine a session resumption and deletes the copy of the content asset. In various examples, the processor may handle the session interruption by reallocating network resources. In some examples, the content asset may be a first version of the content asset having a first bit rate and the processor may handle the session interruption by providing access to a second version of the content asset having a second bit rate that is less than the first bit rate. In various examples, the processor may handle the session interruption by moving at least a portion of the segments of the content asset to an electronic device closer to a source of the requests.

Figure 3:
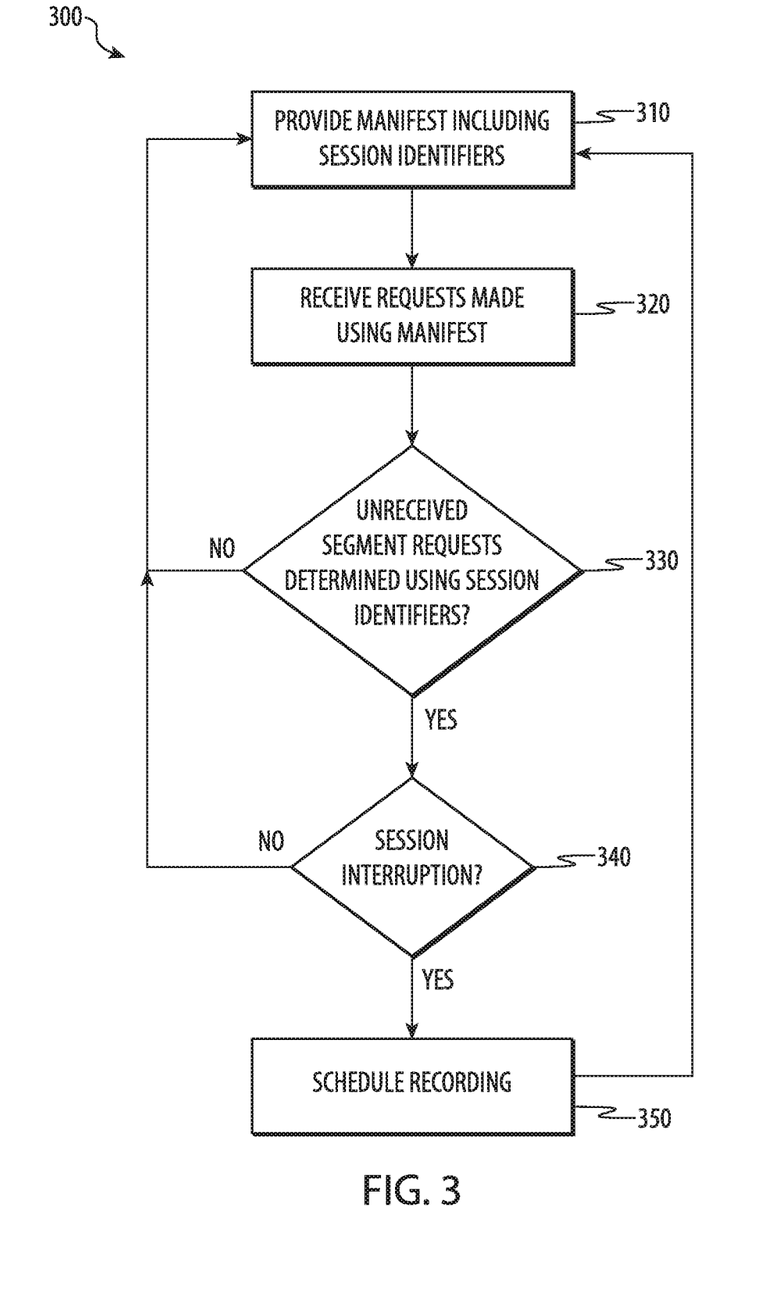
FIG. 3 depicts a flow chart illustrating a second example method for intelligent content server handling of client receipt disruptions. This method may be performed by the system of FIG. 1.

FIG. 3 depicts a flow chart illustrating a second example method 300 for intelligent content server handling of client receipt disruptions. This method 300 may be performed by the system 100 of FIG. 1.

At 310, an electronic device, such as the origin server 101 of FIG. 1, may provide one or more manifests to one or more client electronic devices. The manifest may be a file that details the segments that make up a content asset and may include pointers to those segments and one or more session identifiers. At 320, the electronic device may receive one or more requests for one or more of the segments made by the client electronic device using the manifest.

At 330, the electronic device may use the session identifiers to determine whether or not segment requests have not been received. At 340, the electronic device may determine or estimate whether or not a session interruption has occurred.

For example, a client electronic device may typically request all of the segments of a television program in order to be able to present the television program. If the electronic device only receives requests for half of the segments that make up a television program, that may indicate a session interruption as users do not typically only watch part of a television program unless they stop viewing or switch to viewing something else. The electronic device may analyze a variety of factors (such as the segments that have been requested, the segments that have not been requested, current network bandwidth, and so on) to determine whether the failure to continue requesting segments was intentional. If the electronic device estimates or determines that the failure was not intentional, the electronic device may determine that a session interruption occurred. However, if the electronic device estimates or determines that the failure was intentional, the electronic device may determine that a session interruption has not occurred.

If the electronic device determines that a session interruption occurred, the flow may proceed to 350 where the electronic device may schedule a recording of the content asset before the flow returns to 310 where the electronic device continues providing one or more manifests. Otherwise, the flow may proceed directly to 310 where the electronic device continues providing one or more manifests.

By way of illustration of the example method 300, an origin server may provide segments of a content asset to a smart phone of a user as part of a session via a cellular network. The origin server may determine that the session is interrupted. As such, the origin server may schedule a recording of the content asset in a network digital video recorder system. The origin server may also transmit a notification to the user that the content asset has been recorded for him and provide information (such as a link) that the user may use to access the recoding. In some examples, the origin server may arrange for the recording to be deleted if the user does not access the recording within a time period (such as two hours, one week, and so on). Various configurations are possible and contemplated without departing from the scope of the present disclosure.

By way of another example, the origin server may schedule a recording of the content asset upon determining that the session is interrupted. Subsequently, the origin server may receive segment requests from the smart phone. As such, the origin server may determine that the session is not actually interrupted and that the previous determination was incorrect. Thus, the origin server may direct that the recording be deleted and continue providing requested segments. Various configurations are possible and contemplated without departing from the scope of the present disclosure.

Although the example method 300 is illustrated and described as including particular operations performed in a particular order, it is understood that this is an example. In various implementations, various orders of the same, similar, and/or different operations may be performed without departing from the scope of the present disclosure.

For example, in some implementations, the session may be interrupted due to network bandwidth unavailability. In such an implementation, an origin server may record the content asset and then attempt to transmit the recording to the client electronic device once network bandwidth is again available. Various configurations are possible and contemplated without departing from the scope of the present disclosure.

In various implementations, an electronic device may include a non-transitory storage medium that stores instructions and a processor. The processor may execute the instructions to provide a manifest for a content asset including segment request addresses that have session identifiers, determine unreceived segment requests using the session identifiers, estimate a session interruption using the unreceived segment requests, and schedule a recording of the content asset.

In some examples, the processor may determine a network bandwidth unavailability using received segment requests and the session identifiers. In various such examples, the processor may assign additional network resources based on the network bandwidth unavailability.

In a number of examples, the processor may direct deletion of the recording if the recording is not accessed within a time period. In some examples, the processor may transmit a notification to a user electronic device regarding availability of the recording.

In various examples, the processor may receive segment requests from a first electronic device associated with a user and schedule the recording by directing transmission of the content asset to a second electronic device associated with the user. In some such examples, the first electronic device may be a mobile electronic device and the second electronic device may be a digital video recorder.

Figure 4:
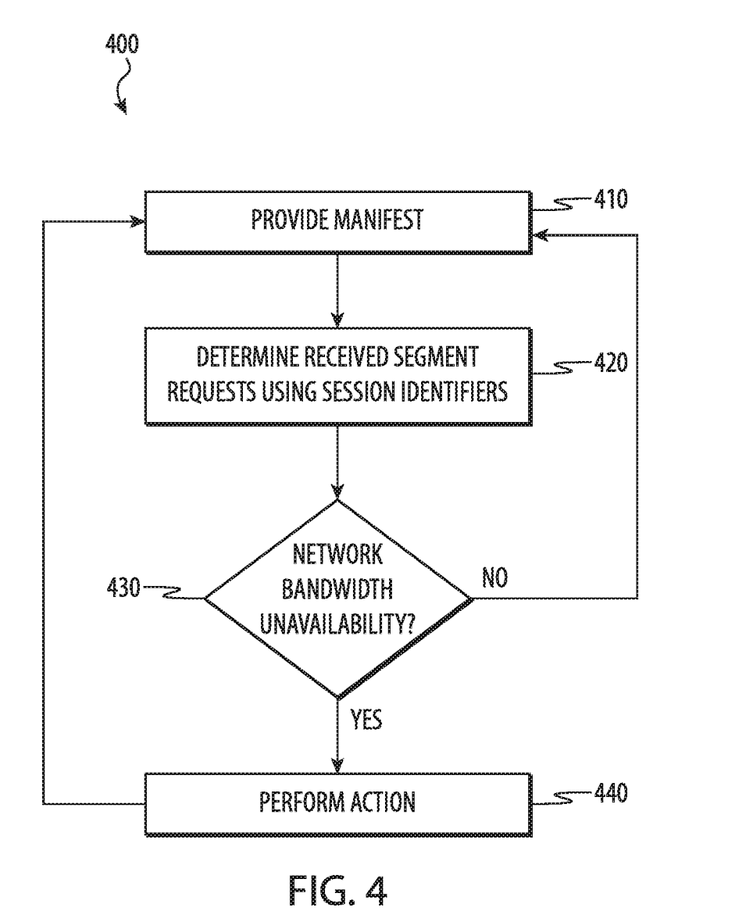
FIG. 4 depicts a flow chart illustrating a third example method for intelligent content server handling of client receipt disruptions. This method may be performed by the system of FIG. 1.

FIG. 4 depicts a flow chart illustrating a third example method 400 for intelligent content server handling of client receipt disruptions. This method 400 may be performed by the system 100 of FIG. 1.

At 410, an electronic device, such as the origin server 101 of FIG. 1, may provide a manifest to a client electronic device. The manifest may be a file that details the segments that make up a content asset and may include pointers to those segments and one or more session identifiers. At 420, the electronic device may use the session identifiers to determine which segments have been requested.

At 430, the electronic device may use the determined received segment requests to determine whether or not a network bandwidth unavailability exists. For example, if the electronic device receives requests for three-fourths of the segments of a content asset, the electronic device may determine that a network bandwidth unavailability may exist. The electronic device may then determine whether or not the time between the received segment requests increased over time, indicating that the network bandwidth was becoming less and less available. If so, the electronic device may determine that a network bandwidth unavailability exists.

In some implementations, the electronic device may analyze received segment requests for multiple sessions that may be related, such as sessions in the same area, using the same communication medium, and so on. The electronic device may determine whether or not received segment requests are related by evaluating the communication medium on which the electronic device received the segment requests (such as via the same cellular network, via the same communication unit, and so on), information in data headers (such as packet headers that state network information regarding the sender of the packets, communication unit identifiers specified in data headers, and so on), and so on.

If the electronic device determines that a network bandwidth unavailability does not exist, the flow may return to 410 where the electronic device provides another manifest. Otherwise the flow may proceed to 440 where the electronic device may perform an action before the flow returns to 410 where the electronic device provides another manifest.

The electronic device may perform a variety of different actions in response to determining that a network unavailability exists. In some implementations, the electronic device may be operative to (and/or direct one or more other devices to) reallocate one or more network resources, reallocate one or more network resources, add additional network resources, and so on and may do so in order to mitigate the network unavailability. For example, the network may include a cellular site tower that is more power efficient operating at 70% capacity and generally operates at that capacity. In such an example, the electronic device may direct the cell site tower to operate at a higher capacity (such as 80%, 85%, and so on) in order to mitigate the network bandwidth unavailability. In other implementations, the electronic device may activate additional cell site towers or other components not currently in use, cease communicating with some client electronic devices in order to be able to continue communicating with others, cease providing segments until the network bandwidth is again available, and so on. Various configurations are possible and contemplated without departing from the scope of the present disclosure.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as performing an action after determining a network bandwidth unavailability. However, it is understood that this is an example. In some implementations, the electronic device may determine a network unavailability without performing any actions in response. Various configurations are possible and contemplated without departing from the scope of the present disclosure.

In some implementations, an electronic device may include a non-transitory storage medium that stores instructions and a processor. The processor may execute the instructions to provide a manifest for a content asset including segment request addresses that have session identifiers, determine received segment requests using the session identifiers, and determine a network bandwidth unavailability by estimating an increased time between the received segment requests using the session identifiers.

In various examples, the processor may estimate a session interruption based on unreceived segment requests determined using the session identifiers. In some such examples, the processor may schedule a recording of the content asset.

In a number of examples, the processor may direct an adjustment of network resources to mitigate the network bandwidth unavailability. In various examples, the received segment requests may be a first set of received segment requests and the processor further may determine the network bandwidth unavailability using a second set of received segment requests.

In some examples, the received segment requests may be received using a wireless network. In various implementations of such examples, the wireless network may be a cellular network.

Figure 5A:
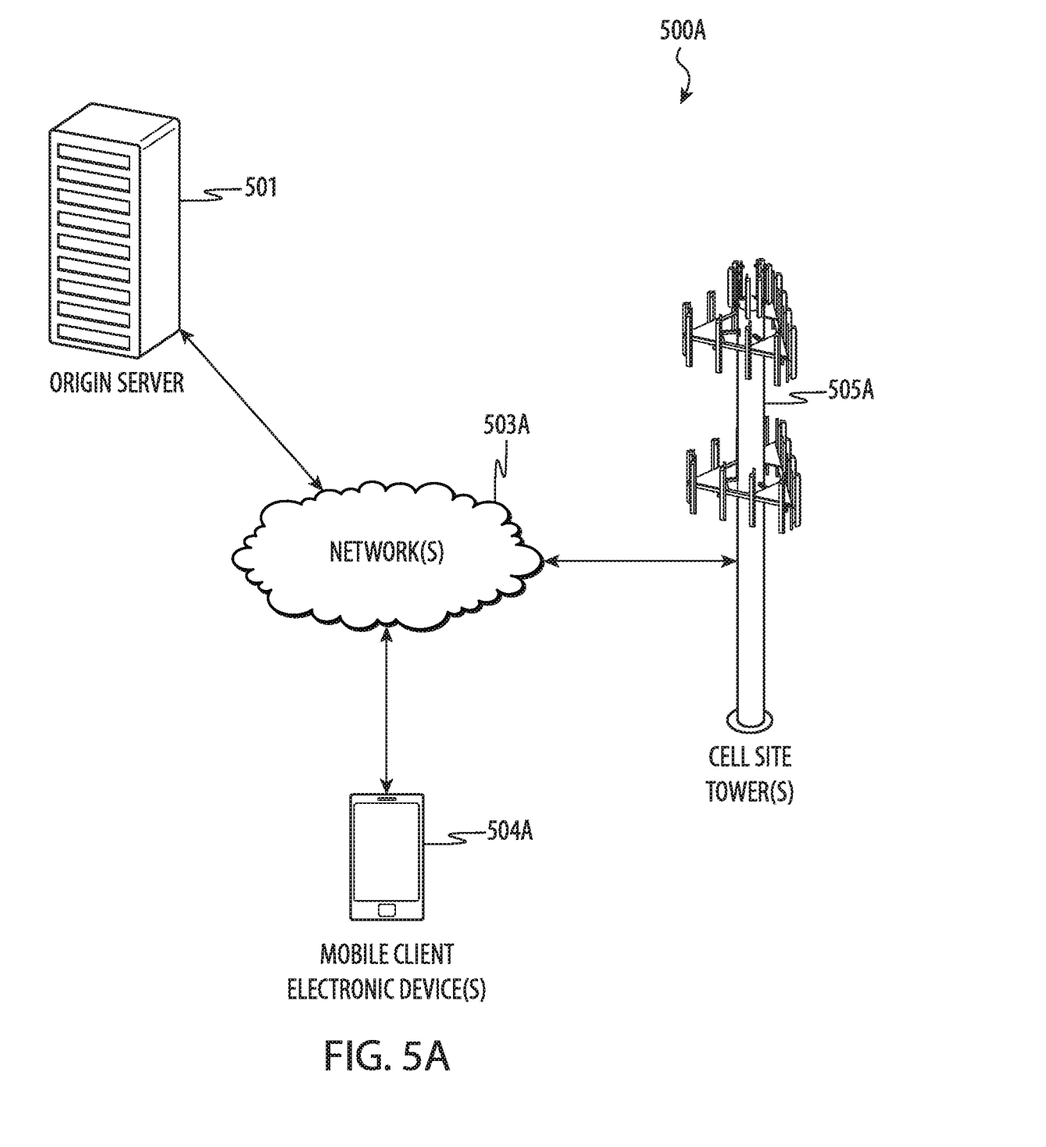
FIG. 5A depicts a second example system for intelligent content server handling of client receipt disruptions.

FIG. 5A depicts a second example system 500A for intelligent content server handling of client receipt disruptions. In various examples, the system 500A may be a content delivery system. In this example, an origin server 501 may be operative to provide one or more segments for one or more content assets requested using one or more manifests that include one or more session identifiers to one or more mobile client electronic devices 504A via a cellular network 503A implemented using one or more cell site towers 505A. The origin server 501 may analyze one or more received segment requests, one or more session identifiers, and/or other information to determine that a session interruption, network bandwidth unavailability, or other client receipt disruption occurs. In response, the origin server 501 may take one or more actions to handle the issue.

Figure 5B:
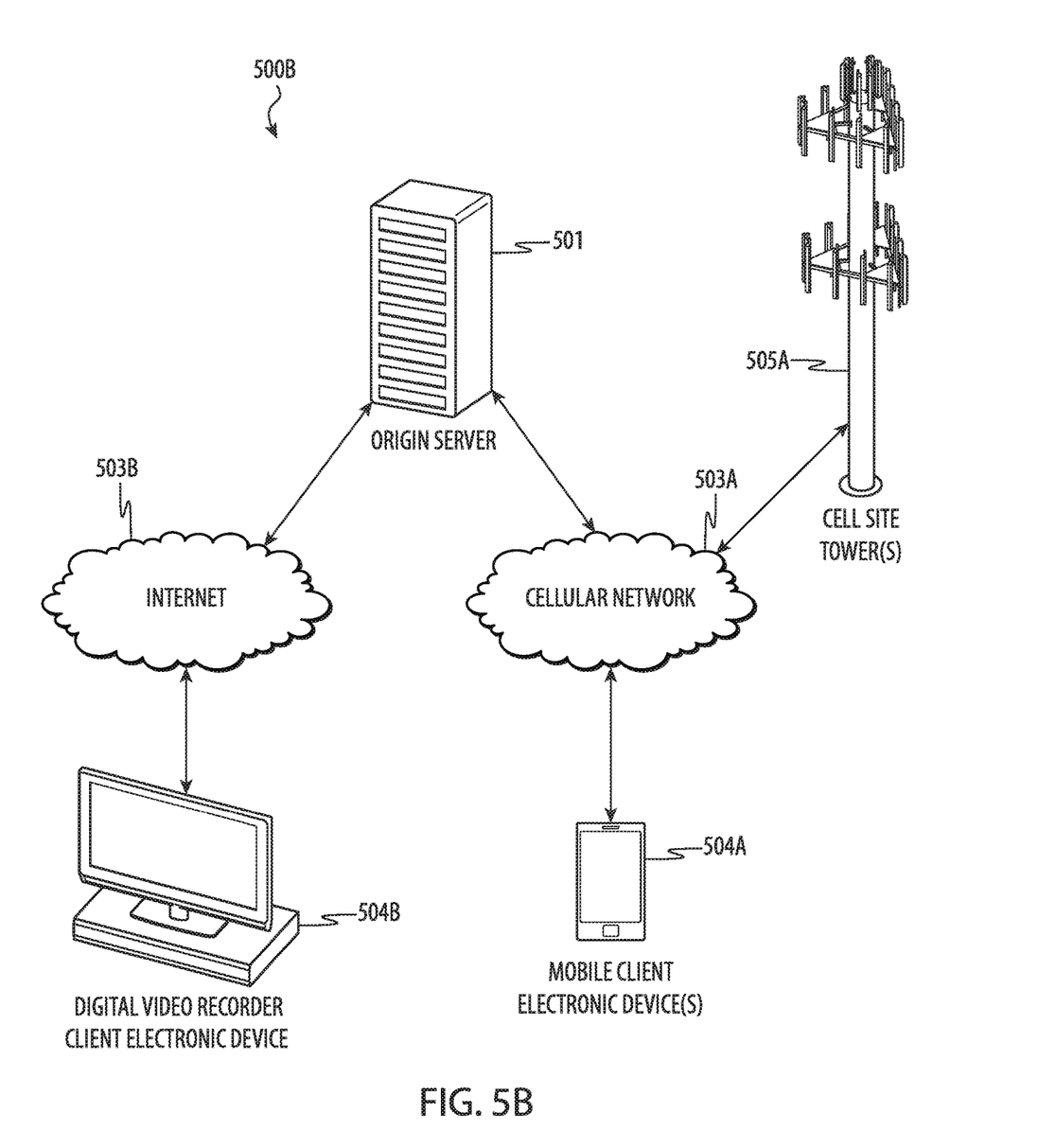
FIG. 5B depicts the system of FIG. 5A handling a client receipt disruption by scheduling a recording to a digital video recorder client electronic device.

For example, in one implementation 500B illustrated in FIG. 5B, the origin server 501 may determine that a session related to a content asset being accessed by a user of the mobile client electronic device 504A has been interrupted. In response, the origin server 501 may communicate with a digital video recorder client electronic device 504B associated with the user via the Internet 503B. This may cause the digital video recorder client electronic device 504B to record a copy of the content asset.

Figure 5C:
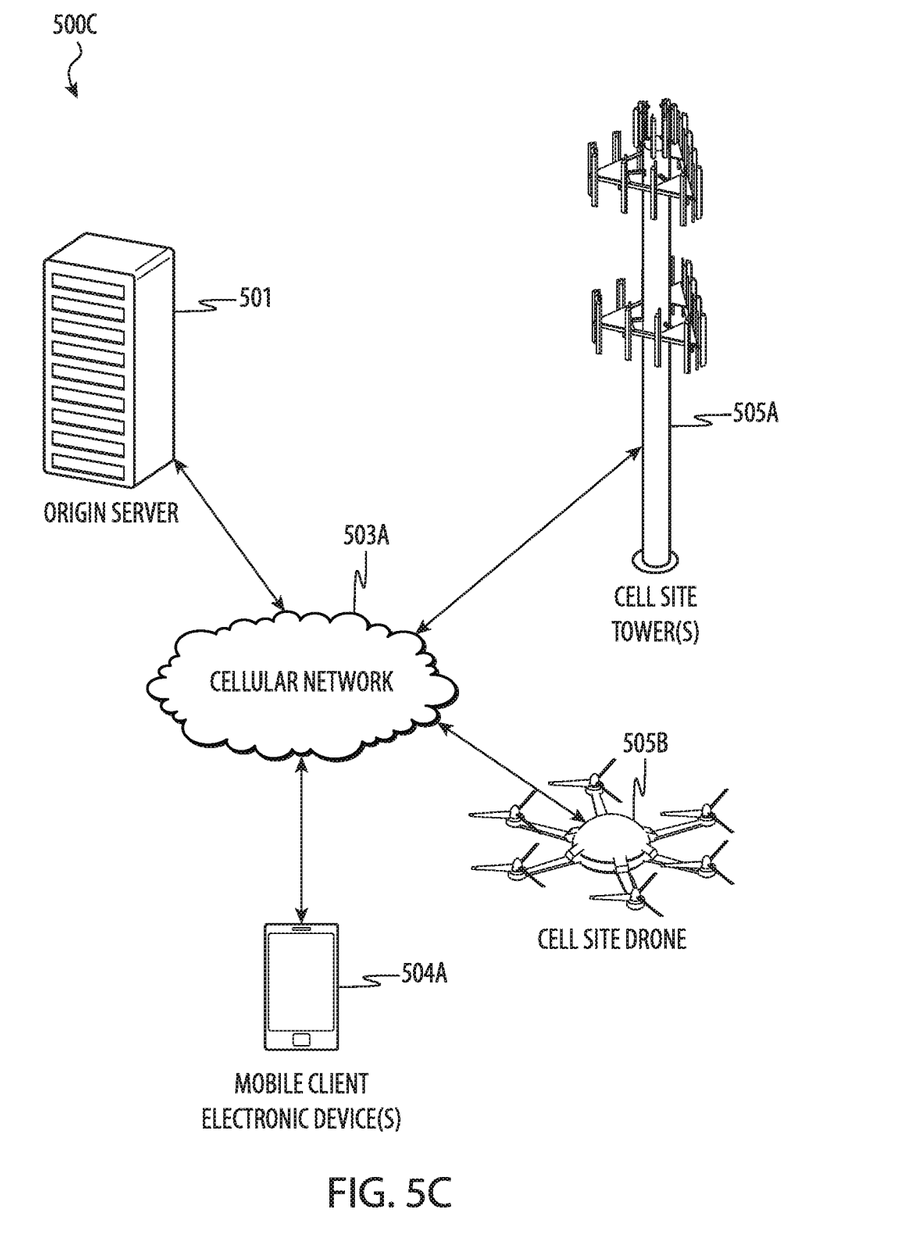
FIG. 5C depicts the system of FIG. 5A handling a client receipt disruption by directing a cell site drone.

By way of another example, in a second implementation 500C illustrated in FIG. 5C, the origin server 501 may determine that the cellular network 503A implemented by the cell site tower 505A does not have sufficient resources for communicating with the mobile client electronic device 504A and that a network bandwidth unavailability exists. In response, the origin server 501 may direct a cell site drone 505B to move into the area and begin operation to increase the available network bandwidth of the cellular network 503A. As a result, the cellular network 503A may have available network bandwidth for the origin server 501 to communicate with the mobile client electronic device 504A.

Figure 6:
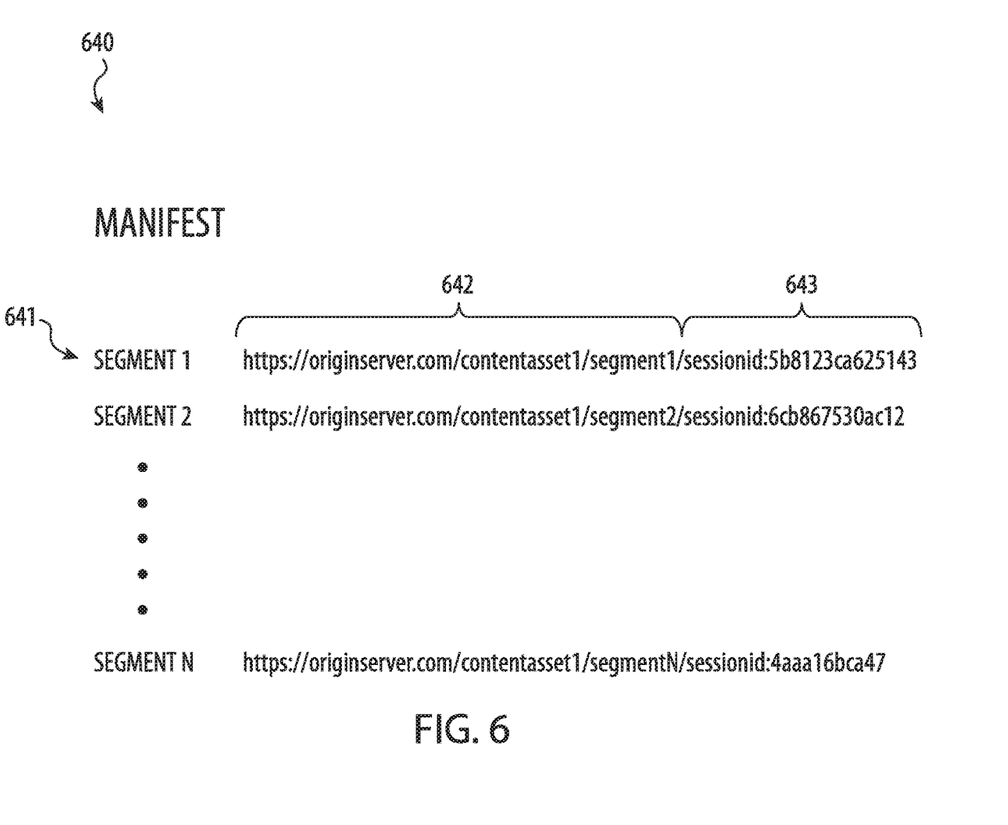
FIG. 6 depicts an example of a manifest that may be used in one or more of the systems and methods of FIGS. 1-5C.

FIG. 6 depicts an example of a manifest 640 that may be used in one or more of the systems 100, 500A-C and methods 200, 300, 400 of FIGS. 1-5C. In this example, the manifest 640 may include a listing 641 for each segment of a content asset. The listing 641 may include a pointer 642 or other mechanism that may be used to retrieve the respective segment. Additionally, the listing 641 may also include a session identifier 643 for the segment. The session identifier 643 may be provided when the pointer 642 is used to request the segment and/or at other times, such as when transmitting an acknowledgement that the requested segment is received.

In this example, the pointer 642 is illustrated as a HyperText Transfer Protocol uniform resource locator. However, it is understood that this is an example and that other pointers and/or other mechanisms that may be used to request a segment may be used without departing from the scope of the present disclosure.

Further, in this example, each listing 641 includes a session identifier 643 and that session identifier 643 is different from those of other listings 641. However, it is understood that this is an example. In other examples, the manifest 640 may use a single session identifier without departing from the scope of the present disclosure. In still other examples, one or more listings 641 (such as all listings 641 in the manifest 640 and/or a subgroup thereof) may include the same session identifier 643. Various configurations are possible and contemplated without departing from the scope of the present disclosure.

A number of different embodiments are illustrated and described above. However, it is understood that these are examples. In various implementations, various features from these different embodiments may be combined in a variety of different ways. Various configurations are possible and contemplated without departing from the scope of the present disclosure.

As described above and illustrated in the accompanying figures, the present disclosure relates to intelligent content server handling of client receipt disruptions. An electronic device (such as an origin server) receives requests for segments of a content asset submitted using a manifest that has segment request addresses with session identifiers, estimates a session interruption using the requests and the session identifiers, and handles the session interruption. The electronic device may handle the session interruption by scheduling a recording of the content asset, reallocating network resources, and so on. In some examples, the electronic device may also provide the manifest. In this way, the electronic device may be able to perform more intelligent content server handling of client receipt disruptions. The electronic device may be able to mitigate disruptions by ensuring that content assets are available for later access when a disruption prevented access, resolve disruptions by reallocating network recourses, improve system performance by improving access to content assets while reducing network traffic, improve system efficiency by reducing storage and/or the components used and/or the actions performed, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a non-transitory storage medium that stores instructions; and
a processor that executes the instructions to:
provide a manifest for a video content asset including segment request addresses that have session identifiers;
obtain a set of the session identifiers from segment requests received from a requestor, the segment requests not including state data for the requestor, the session identifiers each identifying a session and a respective segment;
determine unreceived segment requests using the session identifiers obtained from the segment requests;
estimate a session interruption using the unreceived segment requests; and
schedule a recording of the video content asset.

2. The electronic device of claim 1, wherein the processor determines a network bandwidth unavailability using received segment requests and the session identifiers.

3. The electronic device of claim 2, wherein the processor assigns additional network resources based on the network bandwidth unavailability.

4. The electronic device of claim 1, wherein the processor directs deletion of the recording if the recording is not accessed within a time period.

5. The electronic device of claim 1, wherein the processor:
receives the segment requests from a first electronic device associated with a user; and
schedules the recording by directing transmission of the video content asset to a second electronic device associated with the user.

6. The electronic device of claim 5, wherein:
the first electronic device is a mobile electronic device; and
the second electronic device is a digital video recorder.

7. The electronic device of claim 1, wherein the processor transmits a notification to a user electronic device regarding availability of the recording.

8. An electronic device, comprising:
a non-transitory storage medium that stores instructions; and
a processor that executes the instructions to:
provide a manifest for a video content asset including segment request addresses that have session identifiers;
obtain a set of the session identifiers from segment requests received from a requestor, the segment requests not including state data for the requestor, the session identifiers each identifying a session and a respective segment;
determine received segment requests using the session identifiers obtained from the segment requests; and
determine a network bandwidth unavailability by estimating an increased time between the received segment requests using the session identifiers obtained from the segment requests.

9. The electronic device of claim 8, wherein the processor estimates a session interruption based on unreceived segment requests determined using the session identifiers.

10. The electronic device of claim 9, wherein the processor schedules a recording of the video content asset.

11. The electronic device of claim 8, wherein the processor directs an adjustment of network resources to mitigate the network bandwidth unavailability.

12. The electronic device of claim 8, wherein the received segment requests are received using a wireless network.

13. The electronic device of claim 12, wherein the wireless network is a cellular network.

14. The electronic device of claim 8, wherein:
the received segment requests are a first set of received segment requests; and
the processor further determines the network bandwidth unavailability using a second set of received segment requests.

15. A content delivery system, comprising:
a non-transitory storage medium that stores instructions; and
a processor that executes the instructions to:
receive requests for segments of a video content asset from a requestor, the requests not including state data for the requestor and submitted using a manifest that has segment request addresses with session identifiers;
obtain a set of the session identifiers from the requests, the session identifiers each identifying a session and a respective segment;
estimate a session interruption using the requests and the session identifiers obtained from the requests without reference to state data received from the requestor; and
handle the session interruption.

16. The content delivery system of claim 15, wherein the processor handles the session interruption by storing a copy of the video content asset for the requestor who submitted the requests.

17. The content delivery system of claim 16, wherein the processor:
determines a session resumption; and
deletes the copy of the video content asset.

18. The content delivery system of claim 15, wherein the processor handles the session interruption by reallocating network resources.

19. The content delivery system of claim 15, wherein:
the video content asset is a first version of the video content asset having a first bit rate; and
the processor handles the session interruption by providing access to a second version of the video content asset having a second bit rate that is less than the first bit rate.

20. The content delivery system of claim 15, wherein the processor handles the session interruption by moving at least a portion of the segments of the video content asset to an electronic device closer to a source of the requests.

* * * * *